T. E. Sparks,
Toy Top.
No. 93,760. Patented Aug. 17, 1869.
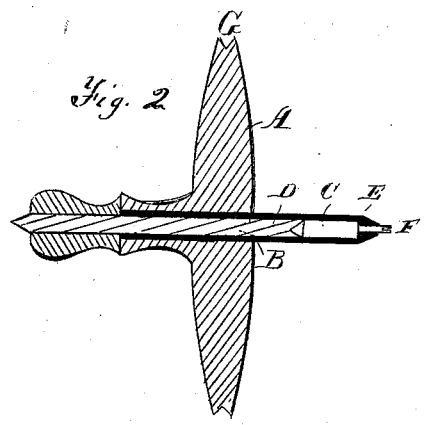
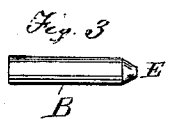
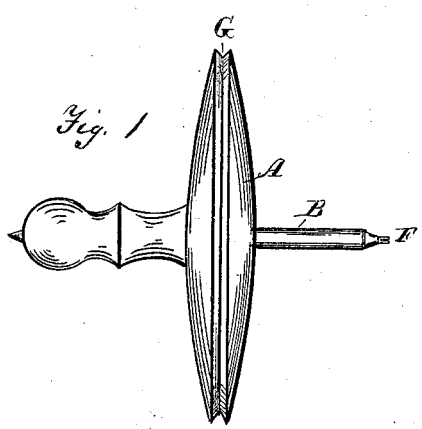
Witnesses
John P. Avery
Webster Park
Inventor
Thomas E. Sparks

United States Patent Office.

THOMAS E. SPARKS, OF NORWICH, CONNECTICUT.

Letters Patent No. 93,760, dated August 17, 1869.

IMPROVEMENT IN TOY-TOPS.

The Schedule referred to in these Letters Patent and making part of the same.

*To all whom it may concern:*

Be it known that I, THOMAS E. SPARKS, of the city of Norwich, county of New London, and State of Connecticut, have invented a new and useful Improvement in Toy-Tops; and I do hereby declare that the following is a full and exact description thereof, reference being had to the annexed drawings, making a part of this specification, in which—

Figure 1 is a perspective view of a top, with my improvement;

Figure 2 is a sectional view of the same;

Figure 3 is a view of the tubular part of the stem of the top;

Figure 4 is a view of the solid part of the same; and

Figure 5 is a view of the independent spindle C, seen in position in fig. 2.

A is the body, and B, the stem, of an ordinary top.

The lower portion of the stem, in my improvement, is made hollow, either by drilling, or by attaching a separate tube, as shown in the drawing, in figs. 3 and 4.

C is the spindle, enclosed in the stem B, having its upper end D pointed, so as to facilitate the turning of the stem upon it.

The lower portion of the spindle, and the lower end of the stem, are made smaller, to form a shoulder, as shown at E, for a bearing, and to keep the spindle in place, as shown in fig. 2.

The lower end of the spindle C is forked or slit, as shown at F, so as to rest astride any proper line.

G is a groove, around the body of the top, so as to run upon the line, when placed in a vertical position.

The nature of my invention consists in making the lower portion of the stem of tops tubular, for the purpose of enclosing an independent spindle, which has, at its upper end, a point, on which the top stem freely turns, the lower end of the tubular portion of the top-stem, and the lower part of the spindle, being constructed so as to form a bearing for the spindle, and, also, a check to keep it in place.

The lower end of the spindle is slit or forked, for the purpose of resting astride any suitable line, as a thread, or the edge of a sword.

The top being set in rapid motion by any of the ordinary modes, and the forked end of the spindle placed upon a slightly-inclined line, the top will move down the incline while it continues in motion.

The circumference of the top is grooved, so that, when set in motion, and placed vertically upon the line, it will run quickly along it.

What I claim as my invention, and desire to secure by Letters Patent, is—

1. The tubular top-stem B, or its equivalent, for holding the spindle, substantially as and for the purposes set forth.

2. The independent spindle C, having its lower end forked, and the upper end pointed, for the top-stem to turn upon, or its equivalent, substantially as and for the purposes set forth.

3. The combination of the tubular stem B, or its equivalent, with the forked spindle C, or its equivalent, substantially as and for the purposes set forth.

THOMAS E. SPARKS.

Witnesses:
JOHN P. AVERY,
WEBSTER PARK.